A. & L. CHRONIK.
THREAD COUNTING APPARATUS.
APPLICATION FILED OCT. 26, 1909.

970,795.

Patented Sept. 20, 1910.

WITNESSES:
S. Birnbaum
Henry Zucker

August Chronik
and Louis Chronik
INVENTORS

BY Sigmund Herzog
their ATTORNEY

THE NORRIS PETERS CO., WASHINGTON, D. C.

UNITED STATES PATENT OFFICE.

AUGUST CHRONIK AND LOUIS CHRONIK, OF NEW YORK, N. Y.

THREAD-COUNTING APPARATUS.

970,795.

Specification of Letters Patent. Patented Sept. 20, 1910.

Application filed October 26, 1909. Serial No. 524,757.

*To all whom it may concern:*

Be it known that we, AUGUST CHRONIK and LOUIS CHRONIK, citizens of the United States, and residents of the city of New York, in the county of New York and State of New York, have invented certain new and useful Improvements in Thread-Counting Apparatus, of which the following is a specification.

The present invention relates to thread counting apparatus, and more particularly to that type which forms the subject matter of the United States Letters Patent No. 901,879, granted to us under the date of October 20, 1908.

The object of the present invention is to generally improve the construction of the apparatus described in the abovementioned Letters Patent, and to simplify the arrangement of its parts so as to obtain a device which, although better adapted for use, is less expensive.

Other objects of the invention will be apparent in reading the specification and from an examination of the drawings, forming part of the present application for Letters Patent.

With these objects in view, the invention consists in the present case of a microscope adapted to be shifted upon the apparatus along a scale, in combination with a plurality of inclined mirror surfaces arranged in a plurality of planes and at angles to each other adapted to reflect the light upon the fabric to be examined.

The invention consists also of a pointer facilitating the counting of the threads, which pointer travels with the microscope and is attached to the mirror surfaces in such a manner so as to allow of a ready counting of the threads without obstructing the view through said miscroscope, or covering the graduation upon said scale.

The invention is illustrated in the accompanying drawings, in which—

Figure 1:
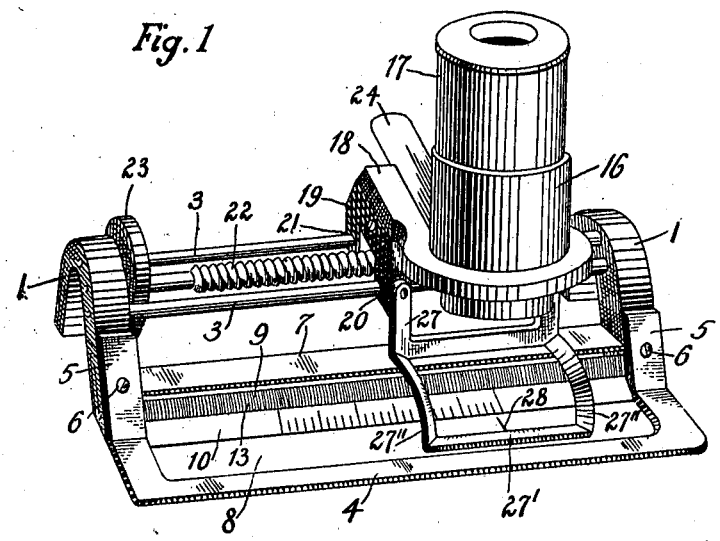
Figure 2:
Figure 3:
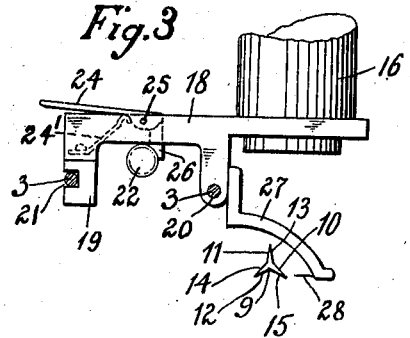
Figure 4:
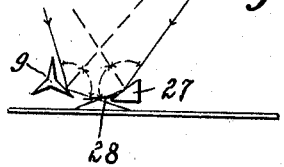

Figure 1 is a perspective view of the apparatus, Fig. 2 a similar view of the scale mounted thereon, Fig. 3 a detail of construction of the shifting means of the microscope, and Fig. 4 a diagrammatic view illustrating the mode of illuminating the fabric.

In the drawings, the numerals 1, 1 indicate the supports of the apparatus, in this case U-shaped members, connected by tie-rods 3, 3. A flat member 4, the ends of which are bent upwardly, as shown at 5, 5, is secured to the U-shaped members by means of screws 6, 6 or their equivalents. To the front portions of the U-shaped members is furthermore secured a bar 7. Between the bar 7 and the plate 4 is thus formed an open space or aperture 8, so that in placing the instrument upon a piece of fabric, the latter will be spread, whereby its surface can be examined without difficulty through the aperture 8.

In counting the threads of a piece of fabric, usually the number contained in a certain length thereof, to be taken as a unit, is to be ascertained. The unit of length may be selected according to the requirements, for instance, in the United States one English inch or a fraction of the same, which fraction may be subdivision of the inch according to the duodecimal system or a fraction of the inch according to the the decimal system is taken as a unit, while in the European countries, or sometimes even in the United States, the length may be the unit of the metric system, that is the centimeter. In order to have these three systems in one device, a triangular scale 9 is rotatably mounted upon the U-shaped members 1, 1 in such a manner that the graduated planes thereof may be brought into or nearly into contact with the piece of fabric, the threads of which are to be counted. More particularly, this triangular scale is mounted between the flat plate 4 and the bar 7, so that its graduations and the fabric can be easily viewed through a microscope, hereinafter to be referred to. This scale serves at the same time to reflect the incident rays of light upon the surface of the fabric, and for this purpose the scale is provided with six planes, of which the planes 10, 11 and 12 are provided with graduations, while the planes 13, 14 and 15 are ground and polished to form mirror-like surfaces which throw the light upon the fabric. The planes 10, 11 and 12 are differently graduated, each according to one of the systems above referred to.

In order to facilitate the counting of the threads of the fabric, the instrument is provided with a microscope 16, which is of the usual construction, being provided with an object glass and a draw-tube 17 for focusing. The microscope is mounted upon a base plate 18, which is carried by supporting frames 19, 19, the holes 20 and 21 of which are in engagement with the tie-rods 3, 3, whereby the microscope may be shifted longitudinally upon the apparatus in a plane parallel to the plane of the fabric. The shifting means comprises a screw bolt 22, rotatably mounted in the U-shaped members, and carrying a knob 23 by which the screw-bolt is taken hold of and rotated. The connection between the screw bolt 23 and the microscope is made by means of a lever 24, fulcrumed at 25 to the base plate 18 and being provided with a segmental nut 26, engaging the screw bolt 22. The segmental nut is kept in engagement with the screw bolt by means of a spring 24', which is secured to the base plate 18 and engages the lever 24.

The illuminating surfaces upon the triangular scale 9 reflect the light upon the fabric only when the instrument is placed in a position in which the light is adapted to reach the front of the instrument. As in many cases this would be impracticable or even impossible, further means must be provided which reflect the light onto the fabric, irrespective of the direction in which the light falls upon the instrument. This means comprises a substantially oblong frame 27, attached to the supporting frames 19, 19 and traveling with the microscope. Three of the sides of this frame are provided with inclined reflecting surfaces, one of which, indicated at 27', is arranged in front of the microscope and the triangular scale, while the two others, 27'', 27''', are arranged at right angles to the surface 27' substantially in line with the supporting frames 19, 19. By this arrangement, of course, if a source of light is provided, the entire surface of the fabric under observation is illuminated, since the mirror surfaces of the frame 27 together with the mirror surfaces of the triangular scale constitute a reflector, one or the other part of which will always be exposed to the light and reflect the same in the desired direction.

To the reflecting surface 27' of the frame 27 is secured a pointer 28, the point of which is arranged in the longitudinal axis of the microscope and close to the triangular scale. This pointer, of course, travels thus with the microscope and marks upon the fabric always the longitudinal axis of the same, whereby errors in the counting are avoided.

The operation of the device is as follows: The fabric to be examined is placed upon a support, such as a table, and the instrument then placed upon the same in such a manner that the threads to be counted are located substantially at right angles to the longitudinal axis of the device. The scale which it is desired to take as a unit is then brought into its position and the draw-tube 17 of the microscope operated, whereby the fabric is focused. The microscope, and the pointer coöperating therewith, is then brought to the starting point of the scale by forcing the lever 24 downward, whereby the nut and the screw are disengaged, allowing thus the microscope to be shifted to the starting point or its vicinity. When now the knob 23 is turned, the pointer can be brought to coincide exactly with the starting point of the scale, and, in continuing then the rotation, the threads can be counted in an an easy and reliable manner.

It is, of course, understood that the screw bolt 22 should be provided with micrometric screw threads, so that it is adapted for use in examining very fine fabrics.

While herein the device is described with minute details, it will be observed that many minor changes may be made in the construction, shape, size and configuration of the parts without departing from the spirit or sacrificing any of the advantages of the invention. For instance, the frame of the apparatus may be of any suitable configuration, the means for shifting the microscope thereon may be of any other well known construction, as the invention defined in the appended claims lies mainly in the arrangement of the microscope, the reflecting frame traveling therewith and the pointer arranged thereon.

What we claim is:

1. In an instrument for counting threads of fabrics, the combination with a supporting frame adapted to rest flat on the fabric and having an aperture through which the threads of said fabric can be counted, of a microscope carried by said frame and adapted to move in a direction parallel to the plane of the fabric, means secured to and moving with said microscope for illuminating the surface of the fabric being examined, a pointer arranged in the longitudinal axis of said microscope carried by said illuminating means, and a scale mounted upon said frame adjoining said aperture.

2. In an instrument for counting threads of fabrics, the combination with a supporting frame adapted to rest flat on the fabric and having an aperture through which the threads of said fabric can be counted, of a microscope carried by said frame and adapted to move in a direction parallel to the plane of the fabric, a frame secured to and moving with said microscope provided with reflecting surfaces arranged in a plurality of planes for illuminating the surface of the fabric being examined, a pointer arranged in the longitudinal axis of said microscope carried by said illuminating frame, and a scale mounted upon said supporting frame adjoining said aperture.

3. In an instrument for counting threads of fabrics, the combination with a supporting frame adapted to rest flat on the fabric and having an aperture through which the threads of said fabric can be counted, of a microscope carried by said frame and adapted to move in a direction parallel to the plane of the fabric, a frame secured to and moving with said microscope provided with reflecting surfaces arranged in a plurality of intersecting planes for illuminating the surface of the fabric being examined, a pointer arranged in the longitudinal axis of said microscope carried by said illuminating frame, and a scale mounted upon said supporting frame adjoining said aperture.

4. In an instrument for counting threads of fabrics, the combination with a supporting frame adapted to rest flat on the fabric and having an aperture through which the threads of said fabric can be counted, of a microscope carried by said frame and adapted to move in a direction parallel to the plane of the fabric, means secured to and moving with said microscope for illuminating the surface of the fabric being examined, a scale mounted upon said frame adjoining said aperture, and a pointer carried by said illuminating means, its point being arranged in the longitudinal axis of said microscope and close to said scale, but not contacting with the latter.

5. In an instrument for counting threads of fabrics, the combination with a supporting frame adapted to rest flat on the fabric and having an aperture through which the threads of said fabric can be counted, of a microscope carried by said frame and adapted to move in a direction parallel to the plane of the fabric, a frame secured to and moving with said microscope provided with reflecting surfaces arranged in a plurality of planes for illuminating the surface of the fabric being examined, a scale mounted upon said supporting frame adjoining said aperture, and a pointer carried by said illuminating frame, its point being arranged in the longitudinal axis of said microscope and close to said scale, but not contacting with the latter.

6. In an instrument for counting threads of fabrics, the combination with a supporting frame adapted to rest flat on the fabric and having an aperture through which the threads of said fabric can be counted, of a microscope carried by said frame and adapted to move in a direction parallel to the plane of the fabric, a frame secured to and moving with said microscope provided with reflecting surfaces arranged in a plurality of intersecting planes for illuminating the surface of the fabric being examined, a scale mounted upon said supporting frame adjoining said aperture, and a pointer carried by said illuminating frame, its point being arranged in the longitudinal axis of said microscope and close to said scale, but not contacting with the latter.

Signed at New York, in the county of New York and State of New York, this 20th day of October, A. D. 1909.

AUGUST CHRONIK.
LOUIS CHRONIK.

Witnesses:
SIGMUND HERZOG,
S. BURNBAUM.